(12) United States Patent
Richter

(10) Patent No.: US 7,241,069 B2
(45) Date of Patent: Jul. 10, 2007

(54) UNIVERSAL JOINT ARRANGEMENT BETWEEN AN APPARATUS HOLDER AND A SUPPORT ARM OR A CONSOLE

(76) Inventor: Harald Richter, Höhenstrasse 22, 75331 Engelbrand (DE)

( * ) Notice: Subject to any disclaimer, the term of this patent is extended or adjusted under 35 U.S.C. 154(b) by 0 days.

(21) Appl. No.: 11/389,611

(22) Filed: Mar. 24, 2006

(65) Prior Publication Data
US 2006/0177262 A1    Aug. 10, 2006

Related U.S. Application Data

(63) Continuation-in-part of application No. 11/133,065, filed on May 19, 2005, now abandoned.

(30) Foreign Application Priority Data

Feb. 7, 2005   (DE) .................. 20 2005 001 986
Jan. 21, 2006  (EP) .................. 06001287

(51) Int. Cl.
  *F16C 11/00*   (2006.01)
  *F16D 1/12*    (2006.01)
(52) U.S. Cl. .................. 403/122; 403/87; 403/90; 403/131; 248/288.31; 248/918; 248/923
(58) Field of Classification Search ............ 256/1, 256/13.1, 19; 404/6; 405/284
See application file for complete search history.

(56) References Cited

U.S. PATENT DOCUMENTS

| | | | | |
|---|---|---|---|---|
| 1,446,164 A | * | 2/1923 | Eyraud ................ | 403/123 |
| 1,905,788 A | * | 4/1933 | Bast ................... | 200/83 P |
| 1,909,526 A | * | 5/1933 | Falge et al. .......... | 359/606 |
| 2,126,389 A | * | 8/1938 | Hufferd ............... | 403/51 |
| 3,477,678 A | * | 11/1969 | Icke et al. ........... | 248/288.31 |
| 4,157,876 A | * | 6/1979 | DiGiulio .............. | 403/90 |
| 5,092,552 A | * | 3/1992 | Dayton et al. ........ | 248/280.11 |
| 6,736,852 B2 | * | 5/2004 | Callaway et al. ...... | 623/19.14 |
| 6,896,436 B2 | * | 5/2005 | McDevitt .............. | 403/123 |
| 7,114,688 B2 | * | 10/2006 | Rudolf ................ | 248/278.1 |

* cited by examiner

*Primary Examiner*—Daniel P. Stodola
*Assistant Examiner*—Nahid Amiri
(74) *Attorney, Agent, or Firm*—Klaus J. Bach

(57) ABSTRACT

In a universal joint arrangement between an apparatus holder and an apparatus support console including a receiver element mounted to the console, a ball joint element projecting from the holder, a ball element for engaging the ball joint element and the receiver element and a clamping mechanism comprising a bolt and a nut, the bolt extends through the ball joint element and the receiver element and the nut or the bolt head is retained in an operating wheel which is disposed adjacent the receiver element so as to be rotatable by the fingers of a user for adjusting the clamping force engaging the ball joint element between the receiver element and the ball element.

12 Claims, 5 Drawing Sheets

UNIVERSAL JOINT ARRANGEMENT BETWEEN AN APPARATUS HOLDER AND A SUPPORT ARM OR A CONSOLE

This is a Continuation-in-Part Application of application Ser. No. 11/133065 filed May 19, 2005 now abandoned.

BACKGROUND OF THE INVENTION

The invention relates to a universal joint arrangement for the interconnection of an apparatus holder or an apparatus holder mounting plate or a similar device and a support arm or a support console.

Mobile apparatus such as minicomputers, so-called PDA's (Personal Digital Assistants) navigation apparatus, mobile telephones and similar apparatus are used in motor vehicles, on desks or at other locations in connection with apparatus carriers which include a console or a support arm, to which an apparatus holder or a mounting plate for supporting an apparatus holder is connected by way of a joint structure so that the respective apparatus can be adjusted to a position which is convenient for the observation of the visual display of the apparatus and for the operation of the apparatus.

Universal joints for that purpose are known in the form of two adjacent hinge joints oriented so as to be pivotable in rectangularly displaced planes and also in the form of ball joints with spherical segment-shaped joint parts. In order to hold a particular apparatus stable in a selected position, it is of course necessary that the joint mechanism can be locked or that it is pretensioned so as to provide for sufficient friction between the joint parts to hold the joint parts in a particular selected position. In known ball joint mechanisms, the required clamping tension is generated in that a screw is screwed from the mounting plate that is from the side of the apparatus into the seating area of the joint mechanism and tightened to the degree needed to engage the joint parts. However, since the joint parts all consist essentially of plastic material which has a heat expansion coefficient different from the engagement means substantial problems have been encountered particularly in connection with the use of such joints in motor vehicles because of the high temperature changes for example as a result of the heating of vehicles parked in the summertime in the sun. Then, it has been found that the clamping tension becomes so relaxed that the apparatus holder will no longer maintain the adjusted position. This can be not only very annoying because it makes the use of the apparatus difficult but also because the necessary tensioning can be performed only with the use of a fitting screw driver and this process is often possible only by the removal of the apparatus holder or even additionally the mounting plate. Furthermore, upon cooldown, the joint may be so tight that it can no longer be adjusted.

It is therefore the object of the present invention to provide an arrangement by which the problem described above can be controlled easily and without complicated design features.

SUMMARY OF THE INVENTION

In a universal joint arrangement between an apparatus holder and an apparatus support console including a receiver element mounted to the console, a ball joint element projecting from the holder, a ball element for engaging the ball joint element and the receiver element and a clamping mechanism comprising a bolt and a nut, the bolt extends through the ball joint element and the receiver element and the nut or the bolt head is retained in an operating wheel which is disposed adjacent the receiver element so as to be rotatable by the fingers of a user for adjusting the clamping force engaging the ball joint element between the receiver element and the ball element.

A particular preferred embodiment of the invention will be described below on the basis of the accompanying drawings.

DETAILED DESCRIPTION OF AN EMBODIMENT

Figure 1:
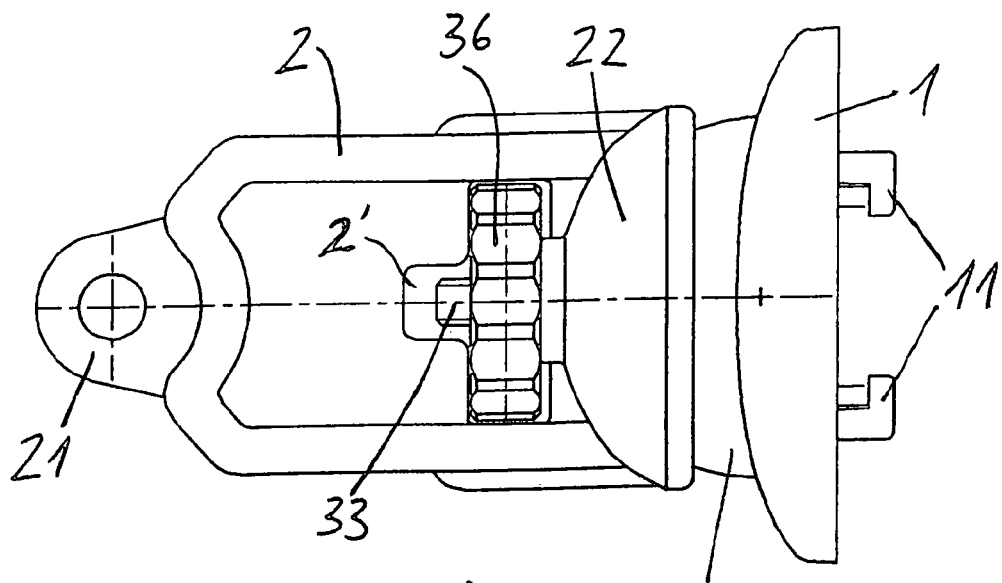
FIG. 1 is a side view of the ball joint arrangement according to the invention.
Figure 2:
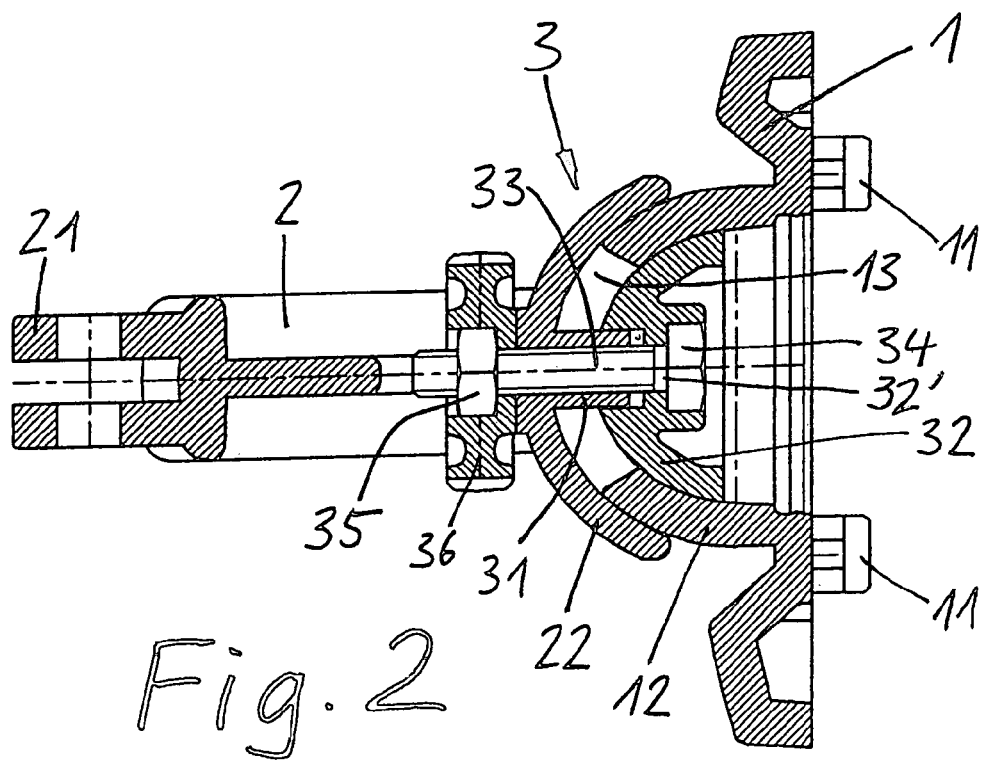
FIG. 2 shows the ball joint arrangement according to the invention in an axial cross-sectional view.

FIGS. 1 and 2 show the joint arrangement according to the invention in connection with an apparatus support plate 1 and a short pivot arm 2 which is the end member of an apparatus carrier which is not shown. The apparatus support plate 1 has angled claws 11 which cooperate with corresponding engagement slots of an apparatus holder which is not shown and, together therewith, form a rapid coupling structure for releasably mounting the apparatus holder. The pivot arm 2, which is shown very short in the figure may of course have any length and, at its rear end, is provided with a forked hinge element 21 which cooperates with a corresponding counter element of a pivot hinge mechanism.

As shown in the side view of FIG. 1 and the cross sectional view of FIG. 2 (in a plane turned by 90°), the ball joint arrangement between the apparatus support plate 1 and the pivot arm 2 consists of a ball joint element 12 disposed on the backside of the mounting plate 1, a ball joint receiver 22 disposed at the front end of the pivot arm 2 and a joint clamping mechanism 3.

The joint clamping mechanism 3 comprises a sleeve member 31 projecting from the ball segment receiver 22, a spherical segment-shaped clamping body 32 disposed on the free end of the sleeve member 31, a bolt 33 extending from the clamping body 32 through the sleeve member 31 and having a head snugly received in a correspondingly shaped recess of the clamping body 32 so as to be held rotationally fixed thereby and a nut 35 threaded onto the bolt 33 behind the ball segment receiver 22 with an adjustment wheel 36 snugly receiving the nut 35 for rotation therewith. As shown in FIGS. 1 and 2, the pivot arm 2 has adjacent the segment receiver 22 a cylindrical recess 2' in which the end of the bolt 33 is accommodated and the clamping body 32 has a recess 32' (FIG. 2) which receives the free end of the sleeve member 31 so as to permit a relative axial movement between the clamping body 32 and the sleeve member 31 over a certain distance.

The ball joint element 12 is therefore received between the segment receiver 22 and the clamping body 32 and is engageable therebetween. As apparent from FIG. 2, the ball joint element 12 has a large central opening 13 through which the sleeve member 31 extends and whose size is so selected that the desired freedom of pivoting of the support plate 1 over a certain range is made possible.

By rotating the adjustment wheel 36 which is preferably knurled at its circumference, the ball joint arrangement can be tightened or loosened any time while the apparatus holder is mounted onto the mounting plate 1 and this can be done without the use of any tools.

As apparent particularly from FIG. 1, the adjustment wheel 36 is arranged within a flat frame structure formed by the pivot arm 2 so that it can be easily grasped with two fingers. Of course, the pivot arm 2 may have any desirable shape or may be replaced by another member of an apparatus support structure.

Figure 3:
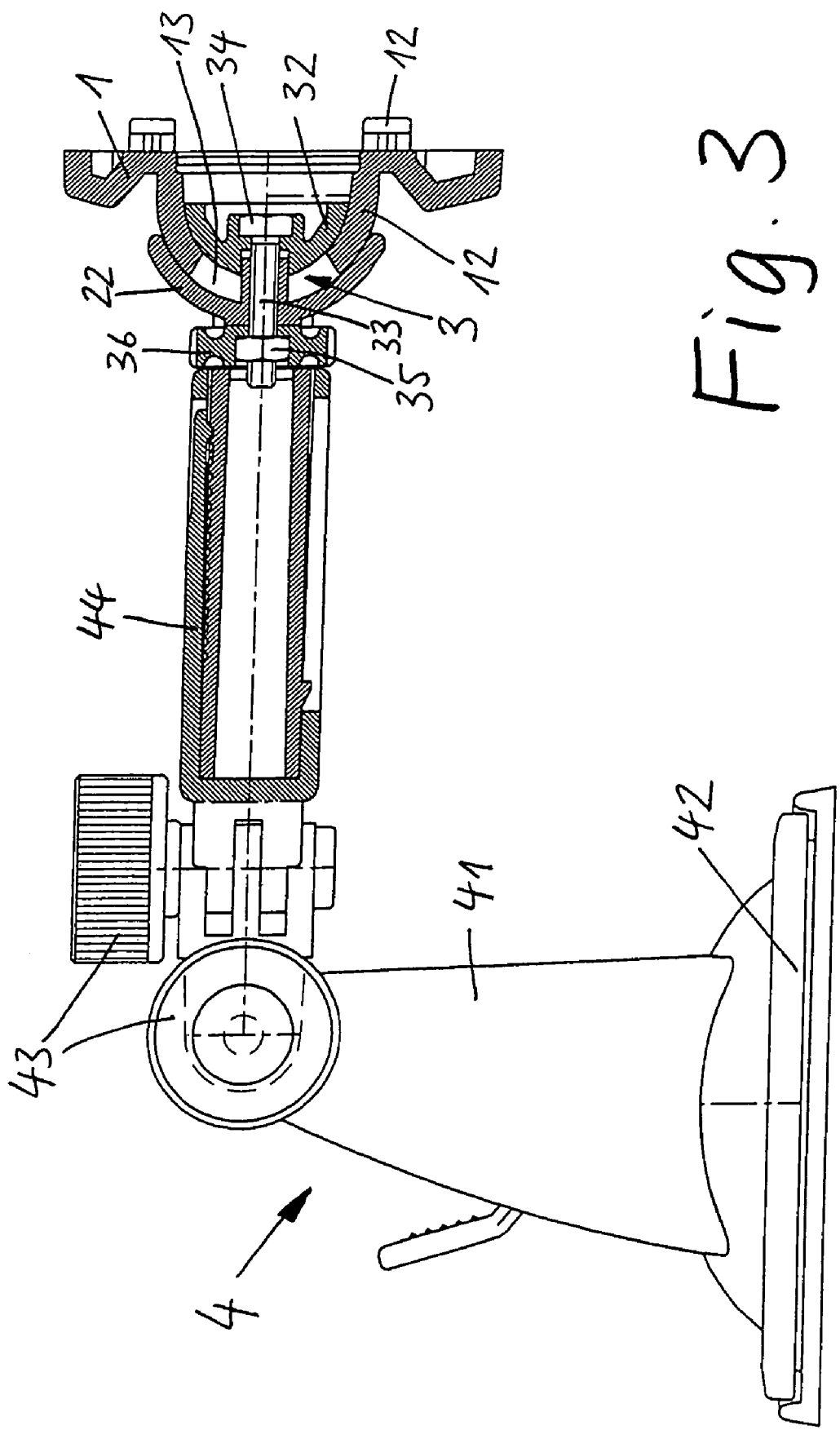
FIG. 3 shows an exemplary application for a ball joint arrangement according to the invention.

As an actual example of an application, FIG. 3 shows a complete apparatus carrier 4 with a column 41, a suction foot 42 with an operating mechanism therefor arranged within the column 41 and a telescopic arm 44 connected thereto by a hinge joint structure 43 having two hinge axes displaced by 90° and carrying at the free end thereof the apparatus support plate 1 by way of the clamping mechanism 3 described above.

Other than described in the shown example, the ball joint structure may also have a clamping mechanism in which the adjustment wheel 36 is connected to the head of a bolt cooperating with a nut received in the clamping body 32.

Figure 4A:
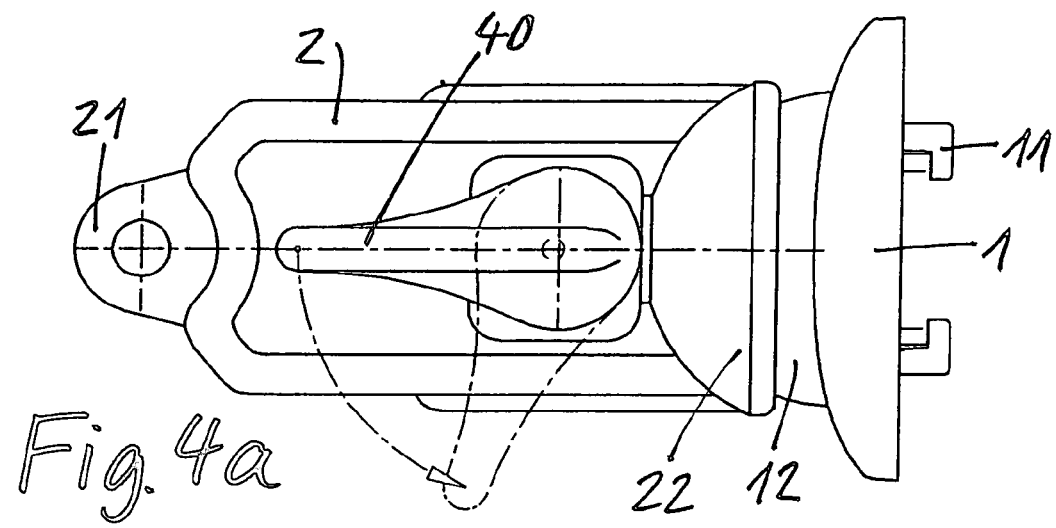
FIGS. 4a, 4b and 4c show another embodiment of a ball joint arrangement according to the invention with an operating lever in a front view and two views rotated by 90°.
Figure 4B:
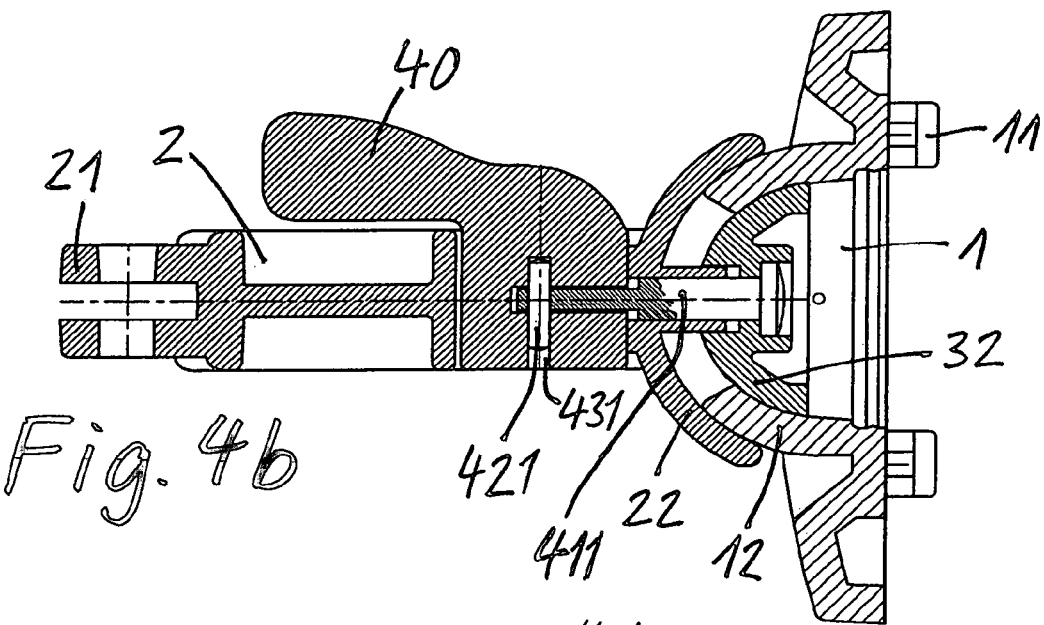
Figure 4C:
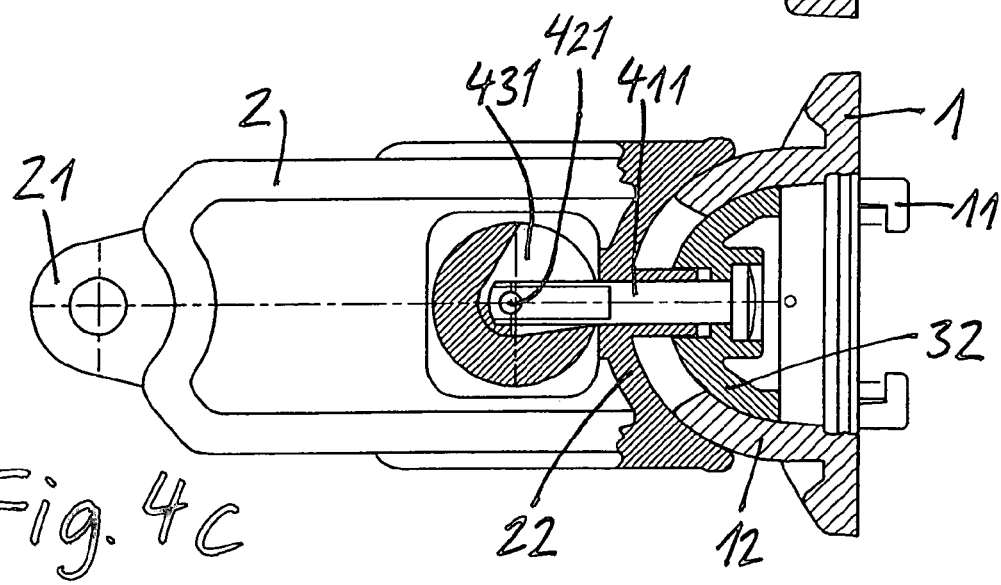

FIGS. 4a to 4c show an embodiment with an eccenter pivot lever 40, which is pivotable about an axis extending transverse to the longitudinal axis of the ball joint arrangement, or respectively, the pivot arm 2, and which is pivotable between a release position and a clamping position. A shaft 411 extending from the clamping body 32 through the ball joint elements is connected at its end adjacent the pivot lever 40 via a transverse pin 421 with the pivot lever 40 as shown in FIG. 4b. The end of the shaft 412 is received in a recess 431 of the pivot lever 40, which has an opening angle corresponding to the pivot range of the pivot lever 40 as shown in FIG. 4c.

In this embodiment, the pivoting of the pivot lever 4 between the release position as shown in FIGS. 4a and 4b and a clamping position as shown in FIG. 4a by a dash-dotted line, the ball joint elements are clamped together or, respectively, by pivoting the pivot lever to the release position, the ball joint element engagement is released.

Figure 5A:
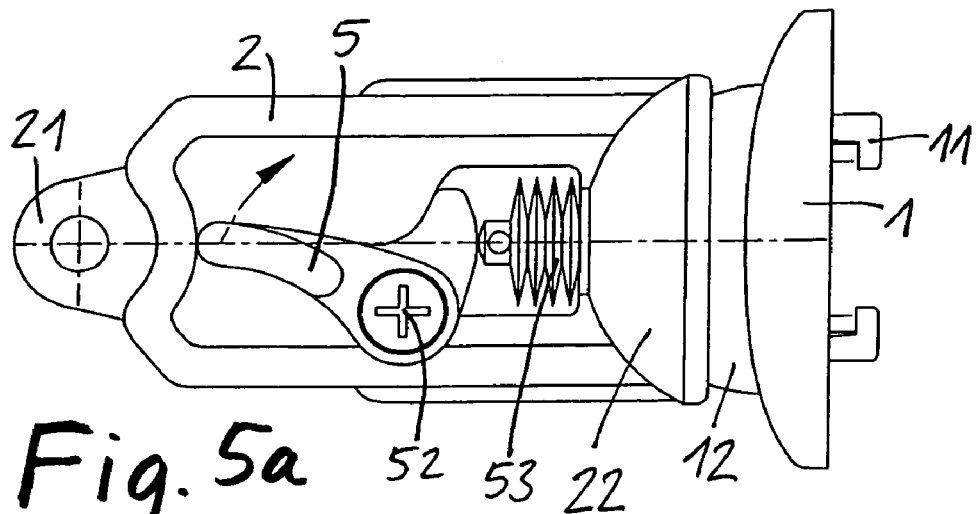
FIGS. 5a, 5b and 5c show still another embodiment including a spring packet by which the ball joint arrangement can be locked and with a lever actuated mechanism for releasing the lock.
Figure 5B:
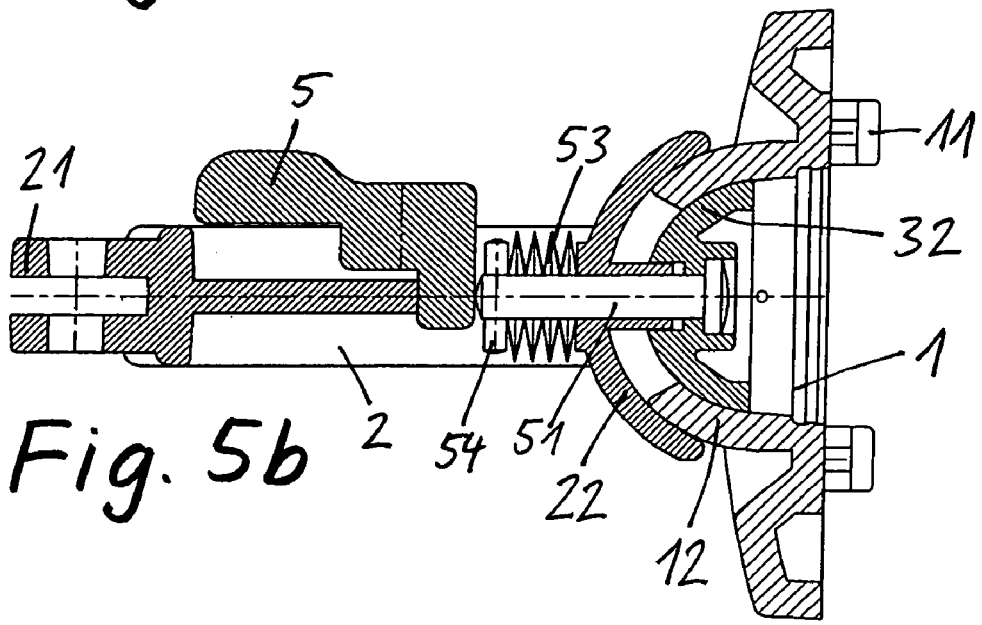
Figure 5C:
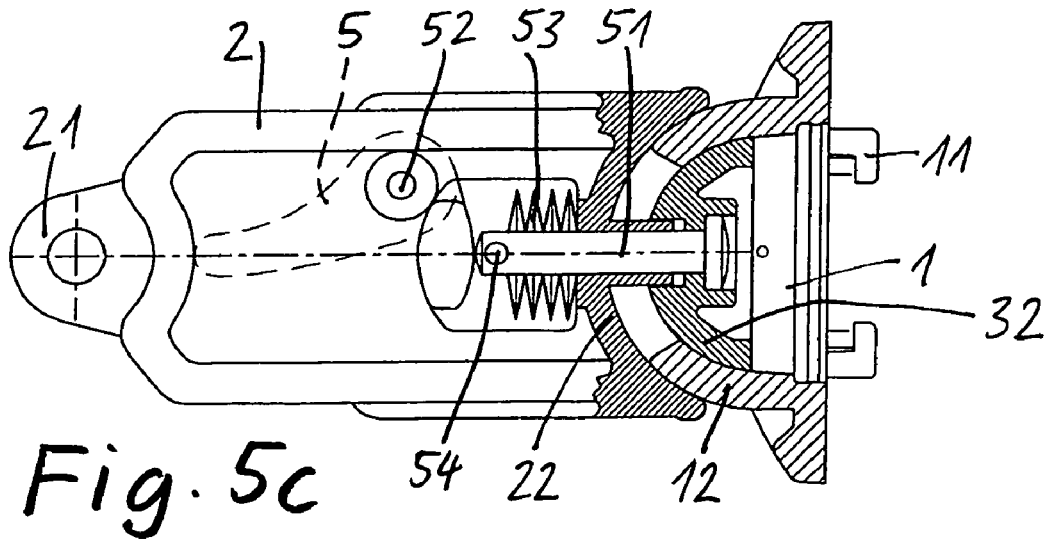

In the embodiment as shown in FIGS. 5a-5c, an operating lever 5 is provided which, again, is supported so as to be pivotable about an axis 54 extending transverse to the longitudinal axis of the ball joint arrangement. The operating lever 5 cooperates with a shaft 51 extending from the clamping body 32. The operating lever is pivotably supported by the transverse shaft structure 52, which is displaced sidewardly from the longitudinal shaft 51. Above the shaft 51, adjacent the ball socket 22, there is a plate spring packet 53, which is held on the shaft 51 by a transverse pin 54 extending through a bore in the shaft 51. The plate spring packet 53 engages the shaft 51 and biases the clamping body 32 into a clamping position. By pivoting the operating lever 5, which is in its release position, in the direction of the arrow shown in FIG. 5a, the shaft 51 is moved against the force generated by the plate spring packet 53 axially to a release position of the ball joint arrangement, whereby the clamping engagement of the ball joint structure is released. Upon returning the operating lever to its rest position, the plate spring packet automatically causes the clamping and consequently the locking of the ball joint arrangement.

In this embodiment, the pivoting of the pivot lever 40 between the release position as shown in FIGS. 4a and 4b and a clamping position as shown in FIG. 4a by a dash-dotted line, the ball joint elements are clamped together or, respectively, by pivoting the pivot lever to the release position, the ball joint element engagement is released.

Figure 6A:
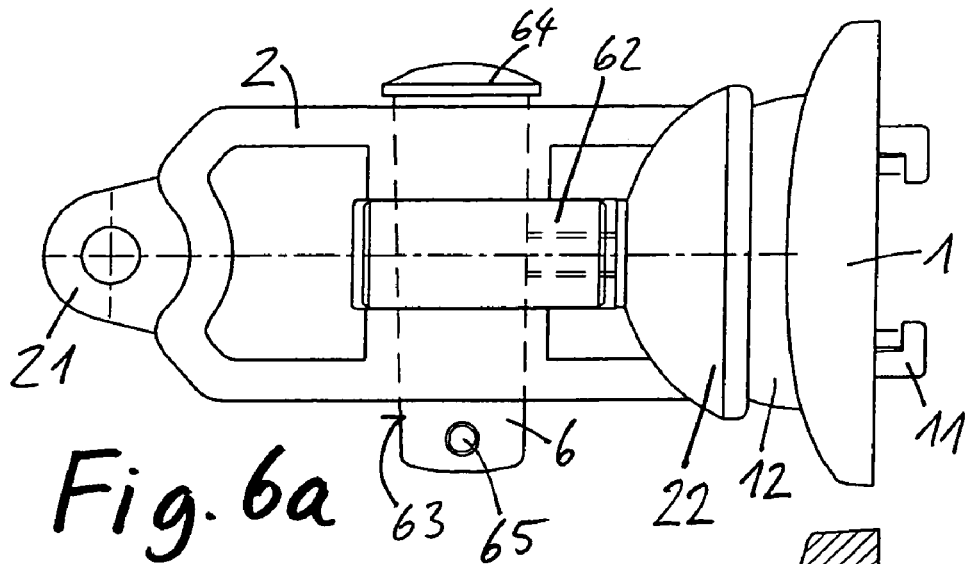
FIGS. 6a, 6b and 6c show still another embodiment including a slide wedge by which the ball joint arrangement can be locked.
Figure 6B:
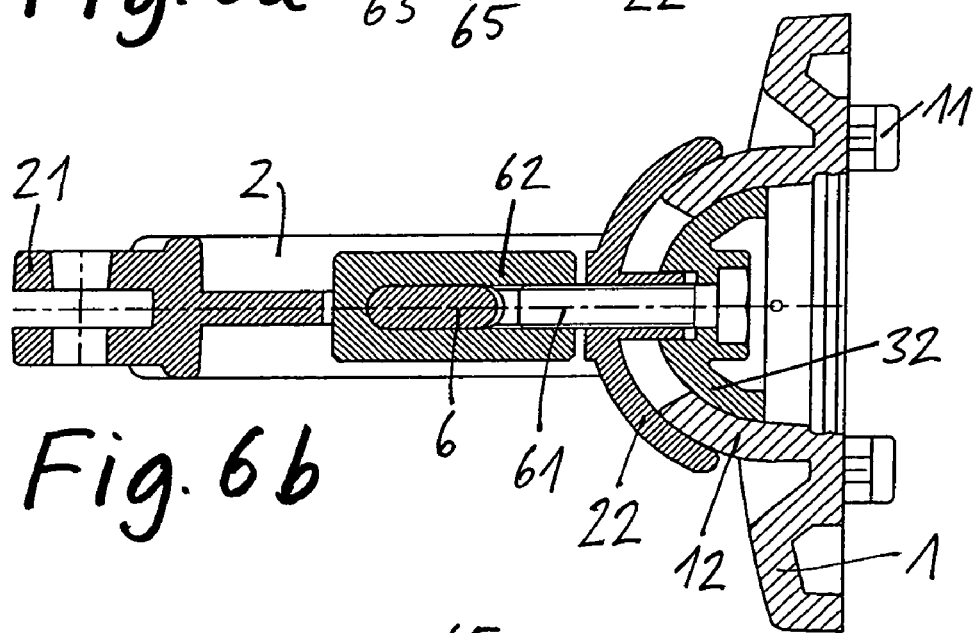
Figure 6C:
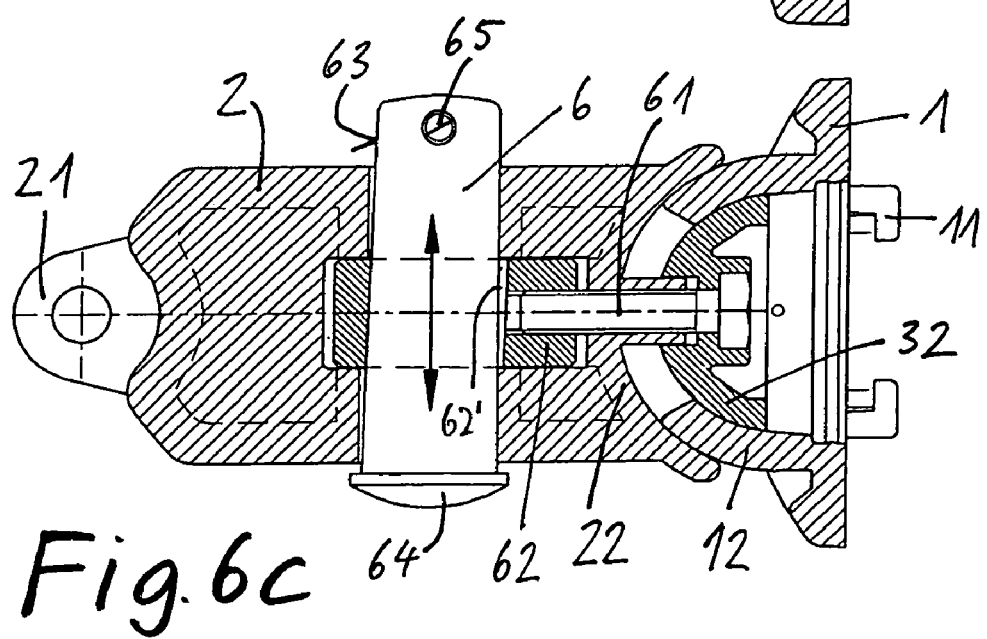

In the figures, the clamping position is shown, wherein a head 64 of the slide wedge 6 is disposed adjacent the pivot arm 2. If the slide wedge 6 is pulled out of this clamping position in the downward arrow direction with reference to FIG. 6c into its release position, the ball joint arrangement is freed. The transverse pin 65 at the free end of the slide wedge serves as a stop for the movement of the slide wedge. The stop for its movement in clamping direction is formed by the head 64.

What is claimed is:

1. A universal joint arrangement (12, 22, 32) disposed between an apparatus support plate (1) and a pivot lever (44) supported on an apparatus support console (4), comprising: a receiver element (22) mounted to one end of the pivot lever (44), a ball joint element (12) projecting from the support plate (1), a clamping body (32) for engaging the ball joint element (12) and the receiver element (22) and a clamping mechanism (3) comprising a shaft (33) and operating members (36, 35, and 34) of which one is mounted to the clamping body (32) and the other provides an engagement force for engaging the ball joint element (12) between the receiver element (22) and the clamping body (32), said pivot lever (44) including two arms (2) connected with one end to the receiver element (22) in spaced relationship and being joined at the opposite ends providing a rigid vibration-free support lever structure for the support plate (1), said shaft (33) extending through the clamping body (32) and the receiver element (22) with the shaft (33) and one of the operating members (34) being engaged with the clamping body (32) and a second one of the operating members (35) and being supported by a third one of the operating members (36) which is disposed adjacent the receiver element (22) between the spaced arms (2) of the pivot lever (44) and being accessible between the spaced arms (2) for adjusting the clamping force engaging the ball joint (12) between the receiver element (22) and the clamping body (32).

2. An arrangement according to claim 1, wherein the receiver element (22) is a bowl-shaped member and the ball joint element (12) is received in the bowl-shaped member and has a center opening (13) through which the shaft (33) passes and which is sufficiently large to provide a desired pivot range for the support plate (1) supported on the support console (4) via the pivot lever (44).

3. An arrangement according to claim 2, wherein the receiver element (22) includes an axially projecting sleeve (31) receiving the shaft (33) and the clamping body (32) has a recess (32') receiving an end portion of the axially projecting sleeve (31) for axially movably guiding the clamping body (32).

4. An arrangement according to claim 1, wherein the shaft is a bolt (33) which is firmly connected to the clamping body (32) and one of the operating members includes a wheel (36) mounted for rotation with a nut (35) threaded onto the bolt (33).

5. An arrangement according to claim 4, wherein the bolt (33) has a bolt head (34) which is snugly engaged in the clamping body (32) so as to be rotationally fixed therewith.

6. An arrangement according to claim 1, wherein the clamping mechanism (3) comprises a bolt-nut pair of which one is rotationally firmly connected to the clamping body (32) and the other is rotationally firmly connected to a finger-operable adjustment wheel (36).

7. An arrangement according to claim 1, wherein one of the operating members is an eccentric lever (40) supported on the shaft (411) so as to be pivotable about an axis extending normal to the axis of the shaft (411) and having an eccentric surface area in contact with the receiver element (22) for pulling the clamping body (32) toward the receiver element (2) and engaging the joint element (12) therebetween.

8. An arrangement according to claim 7, wherein the eccentric lever (40) is pivotally supported by a transverse joint (421) extending through an opening in the shaft (411) and being connected to the shaft and having an eccentric cam seated on a rear surface of the ball joint receiver member.

9. An arrangement according to claim 1, wherein the clamping body (32) is pre-tensioned toward the receiver element (22) by a spring structure (53) so that in their rest positions, the joint element (12) is firmly engaged between the receiver element (22) and the clamping body (32) and one of the operating members (5) engages the shaft (51) for moving the clamping body (32) away from the receiver element (22) against the force of the spring structure (53).

10. An arrangement according to claim 9, wherein the spring structure (53) is a packet of plate springs (53) which, on one hand, abuts the receiver element (22) and on the other, abuts an engagement member (54) disposed on the free end of the shaft (51).

11. An arrangement according to claim 10, wherein one of the operating members (5) is a pivot lever supported so as to be pivotable about a pivot axis (52) extending transverse to the shaft axis and in spaced relationship thereto and which forms a lever element engaging the shaft (51) for moving the shaft (51) against the force of an engagement of the spring structure (53) which biases the receiver element (22) and the engagement member (54) into firm engagement with the joint element (12).

12. An arrangement according to claim 1, wherein one of the operating members is a slide wedge (6) extending through an opening in the shaft (62) and being movable between a clamping position in which the clamping body (32) and the receiver element (22) are biased into firm engagement with the joint element (12) and a release position in which the slide wedge (6) is retracted from its clamping position.

* * * * *